United States Patent Office 3,489,266
Patented Jan. 13, 1970

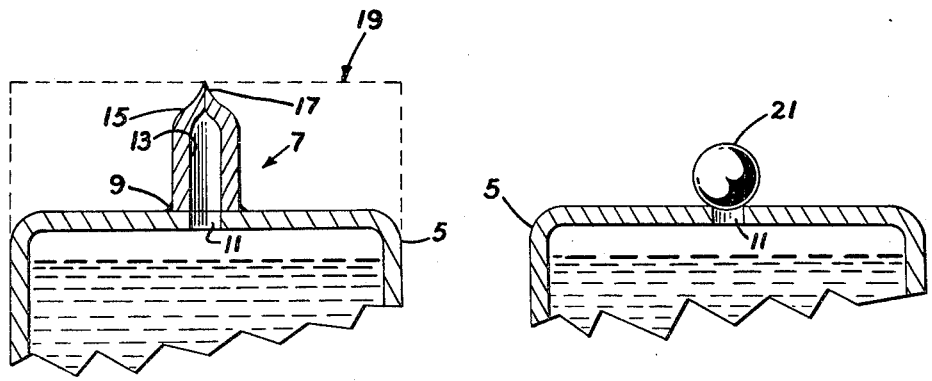
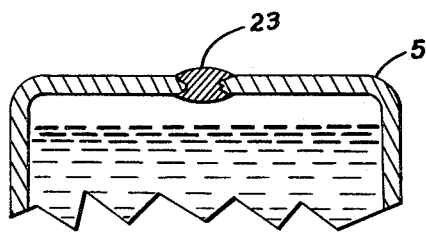

3,489,266
HERMETIC SEAL FOR A THIN-WALLED CONTAINER
Robert Charles Miller, Ottawa, Ohio, assignor to Sylvania Electric Products Inc., a corporation of Delaware
Original application Sept. 23, 1963, Ser. No. 310,775, now Patent No. 3,426,170. Divided and this application July 17, 1968, Ser. No. 745,447
Int. Cl. B65d 5/40, 81/24
U.S. Cl. 206—2                3 Claims

ABSTRACT OF THE DISCLOSURE

A thin-walled container having an aperture therein and containing a corrosive liquid subject to the formation of gases and pressure when heated is hermetically sealed by a process wherein the container surrounding the aperture is contacted by a metal body, the contacting container and body are shielded by an inert atmosphere, energy is applied to the body and container in an amount, at a rate, and for a period sufficient to alloy the container and body without forming gases and pressure, and the application of the energy is discontinued to effect solidification of the alloy hermetically sealing the aperture.

CROSS-REFERENCE TO RELATED APPLICATION

This application is a division of Ser. No. 310,775, filed Sept. 23, 1963, now Patent No. 3,426,170, and assigned to the assignee of the present invention.

BACKGROUND OF THE INVENTION

The present invention relates in general to methods for sealing containers and more particularly to a process for hermetically sealing a container having a corrosive liquid therein susceptible to the formation of gas upon the application of heat thereto.

This invention is of particular value as applied to the sealing of alkaline storage batteries, for instance of the nickel-cadmium type, which contain a potassium hydroxide electrolyte and which are preferably hermetically sealed not only to prevent leakage of the electrolyte but also to prevent corrosion of the inner surface of the container and the formation of carbonates therein. Not only does lost electrolyte impair the operation of the batteries, but also the corrosive nature thereof can cause damage to associated devices in which or with which such batteries are used.

In the past, numerous techniques have been employed in an effort to provide a hermetic seal for a thin-walled container having a corrosive material such as electrolyte therein and adapted for use as a battery or secondary cell. One such process provides a gasket crimped intermediate a metal cover and the container in an effort to prohibit the escape of the electrolyte from the container. Although this process is successful to a degree, the wetting and capillary action of the electrolyte causes leakage from the most minute fissures in such a seal.

Another technique which is not a hermetic seal process but one frequently encountered, is the use of screw caps or screw plugs. Such structures have received limited acceptance but the creepage of the electrolyte along the threads of the screw and the ever-present possibility of the cap or plug becoming loose has restricted the success of such a process.

Still another process for sealing a corrosive material within a thin-walled container has been the use of a fill tube which is attached to the container and extends therefrom. The fill tube provides an entrance for the corrosive material, such as the electrolyte in a battery, and is then pinched off and subsequently welded to provide the hermetic seal. Again, it was found that the corrosive nature of the contained material required a fill tube which would not be deleteriously affected thereby. As a result, a liner of inactive material such as gold was deposited onto the fill tube whereat contact with the corrosive material was intimate.

Thus, it can be seen that such a process requires expensive and complicated equipment and procedures. Also, the materials are costly and the operation difficult necessitating well-trained personnel. Moreover, in the fabrication of batteries wherein the merit of the device is determined in terms of power per unit volume or power per unit weight, the additional volume necessitated by a fill tube is a serious drawback.

OBJECTS AND SUMMARY OF THE INVENTION

It is therefore an object of this invention to hermetically seal a container having a liquid therein susceptible to the formation of gas and pressure upon the application of heat without adding appreciably to the volume requirements of the container.

It is a further object to simplify equipment and manufacturing techniques used in hermetically sealing alkaline battery cells.

In one aspect of the invention, an aperture in a thin-walled container having a corrosive liquid therein subject to formation of gases and pressure upon application of heat thereto is hermetically sealed by contacting the container surrounding the aperture with a metal body having a lower melting temperature than the container and applying energy thereto in an amount, at a rate, and for a period of time sufficient to cause the body and contacting container to alloy and, upon removal of the applied energy, solidify to hermetically seal the container.

For a better understanding of the present invention, together with other and further objects, advantages and capabilities thereof, reference is made to the following disclosure and appended claims in connection with the accompanying drawings.

BRIEF DESCRIPTION OF THE DRAWINGS

FIG. 1 is a partial view in section of a prior art hermetically sealed battery;

FIG. 2 is a partial sectional view of a thin-walled container prior to the formation of a hermetic seal; and FIG. 3 is a partial view in section showing the hermetic seal applied to a battery.

DESCRIPTION OF THE PREFERRED EMBODIMENT

Referring to the drawings, FIG. 1 illustrates a frequently encountered prior art type of hermetic seal adapted for use with batteries and similar thin-walled containers having a corrosive liquid therein. The container 5 has a fill tube 7 welded thereto at a jointure 9 which surrounds an aperture 11 therein. The fill tube 7 has an inner liner 13 of an inactive material such as gold and an outer material 15. The container 5 and outer material 15 of the fill tube 7 are preferably of an easily welded material such as nickel-plated steel. The corrosive liquid is introduced into the container 5 through the fill tube 7 and aperture 11 and the fill tube 7 is subsequently pinched off and preferably welded at a jointure 17 to provide a hermetic seal for the container 5.

Although satisfactory seals are possible with such a technique, it can be readily deduced that a process which requires seals at several locations as well as a lining of inert material is not only complicated but expensive. Moreover, as observable by the dotted line 19, such a technique inevitably results in a large unusable volume which is not compatible with present-day requirements of maximum use of allowable space.

In attempts to provide a hermetic seal in a thin-walled container having electrolyte therein, it has been found most difficult, if not impossible, to meet the requirements of seal quality, allowable space, and cost using any of the known techniques for fabricating such seals. For instance, when the usual arc welding processes are used, the electrolyte disrupts the arc and prohibits the formation of a satisfactory weld. Also, the heat generated during the welding process causes an increase in gas pressure within the container which tends to "blow out" the seal before it can be properly solidified and a hermetic seal formed.

Additionally, in the known techniques of arc welding, it is a common practice to select materials for welding which have a similar, if not exactly the same, melting and vaporization temperature. Unfortunately, such a selection is not satisfactory when the wall of the container is thin because of the tendency for the thin container wall to burn through.

Referring to the drawings, FIG. 2 illustrates the disposition of the materials prior to the formation of a hermetic seal. Herein, a thin-walled container 5 has an aperture 11 and a metal body 21 in contacting relationship with the container 5. The body 21 has a diameter greater than the diameter of the aperture and is of a configuration such that positive contact between the body 21 and the container 5 is obtained with a minimum of effort and skill.

The body 21 is of a material having a lower melting and vaporization temperature than that of the container 5 and may be any one of a number of shapes so long as the desired contactual relationship between the body 21 and container 5 can be obtained. For instance, a truncated cone, a headed rivet-like body and numerous other shapes are equally applicable and appropriate. Also, carbon steel and nickel-gold alloys are especally suitable for body materials with container materials of stainless and nickel-plated steel.

FIG. 3 illustrates the deposition of the hermetic seal after formation in relation to the use thereof in a battery. Herein is shown the thin-walled container 5 and the sealing alloy 23 after the sealing process. It can be observed that the portion of the container 5 previously in contact with the body 19 has now alloyed therewith to provide the sealing alloy 23. It may also be observed that the lost volume indicated by the dotted line 19 in FIG. 1 of the prior art is no longer unavailable for use.

In order to carry out the process, a welding apparatus is required of which many are commercially available and readily obtained. Generally, the welding apparatus has a pair of electrodes and a source of energy along with the usual timing and energy varying controls.

In the process of hermetically sealing a thin-walled container 5 having a thickness in the range of about 0.005 to 0.020 inch, the metal body 21 is disposed within the aperture 11 of the container 5 as illustrated in FIG. 2. Then, the container 5 and metal body 21 are placed intermediate the electrodes of a welding apparatus and a shield is placed about the exposed portion of the body 21 and a gas or gas mixture such as argon or argon-helium is continuously supplied to the shield.

Then, energy is applied to the body 21 in an amount, at a rate, and for a period sufficient to cause the body 21 and surface of the container 5 in contact therewith to flow and alloy. Preferably, the applied energy is in the form of a direct current in the range of about 10 to 75 amperes with a small component of RF energy added thereto for ionization and initiation of an arc. This energy is applied for a very short period, in the range of about 0.05 to 0.20 second, in order to flow the metal without heating the electrolyte sufficiently to cause the formation of gases and pressure.

As a specific example of the process, a metal alloy sphere, about 19% nickel and 81% gold, having a diameter of about 0.040 inch was deposited into an aperture in the wall of a container. The aperture had a diameter of about 0.025 inch and the container was of nickel-plated steel with a thickness of about 0.007 inch.

Then, the container and sphere were placed intermediate a pair of electrodes and the exposed sphere surrounded with a shield. A gas mixture of about 50% argon and 50% helium was continuously supplied to the shield to provide an inert atmosphere around the exposed sphere and the contacting area of the sphere and container.

Following, energy in the form of a direct current of about 25 to 30 amperes with a small RF component added thereto for initiating an arc, was applied to the sphere by electrode means. The duration of the applied energy was about 0.1 second which was sufficient to cause the metal body and contacting container surface to flow and alloy. Upon removal of the applied energy, the melted alloy solidified and hermetically sealed the container.

Thus, there is provided a hermetically sealed thin-walled container having electrolyte therein which, so far as is known, is unobtainable by any other known technique. Moreover, batteries having increased power per unit volume or per unit weight are now easily fabricated at a reduced cost and in a less complex manner. Also, the equipment necessary for providing hermetically sealed batteries has been greatly simplified and the training of personnel sharply reduced.

What is claimed is:

1. In a battery having a thin-walled container of metal with electrolyte therein, a hermetic seal comprising an alloy of said container metal and a metal having a lower melting and vaporization temperature than said container metal.

2. In a battery having a container of stainless steel with a thickness in the range of about 0.005 to 0.020 inch and electrolyte disposed therein, a hermetic seal comprising an alloy of said stainless steel and a nickel-gold alloy having a melting and vaporization temperature lower than said stainless steel.

3. In a battery having a container of stainless steel with a thickness in the range of about 0.005 to 0.020 inch and electrolyte disposed therein, a hermetic seal comprising an alloy of said stainless steel and a low-carbon steel having a melting and vaporization temperature lower than said stainless steel.

References Cited

UNITED STATES PATENTS

| 2,251,345 | 8/1941 | Triplett. |
| 2,232,656 | 2/1941 | Davis. |
| 2,914,346 | 11/1959 | Ryder _____ 29—483 XR |
| 3,037,656 | 6/1962 | Humphrey _____ 220—1 |
| 3,297,225 | 1/1967 | Bransten. |
| 3,364,064 | 1/1968 | Wiseburg _____ 29—199 XR |

RAPHAEL H. SCHWARTZ, Primary Examiner

U.S. Cl. X.R.

29—530; 136—133, 166